US011784506B2

(12) United States Patent
Yu et al.

(10) Patent No.: US 11,784,506 B2
(45) Date of Patent: Oct. 10, 2023

(54) POWER TRANSFORMATION WITH POWER SOURCE BALANCING IN AN APPARATUS

(71) Applicant: AURORA FLIGHT SCIENCES CORPORATION, A SUBSIDIARY OF THE BOEING COMPANY, Manassas, VA (US)

(72) Inventors: Wenjiang Yu, Nokesville, VA (US); John F. Merk, Haverhill, MA (US); James Perkinson, Winchester, MA (US)

(73) Assignee: Aurora Flight Sciences Corporation, A Subsidiary Of The Boeing Company, Manassas, VA (US)

( * ) Notice: Subject to any disclaimer, the term of this patent is extended or adjusted under 35 U.S.C. 154(b) by 0 days.

(21) Appl. No.: 17/457,375

(22) Filed: Dec. 2, 2021

(65) Prior Publication Data

US 2022/0255337 A1     Aug. 11, 2022

Related U.S. Application Data (60) Provisional application No. 63/147,550, filed on Feb. 9, 2021.

(51) Int. Cl.
| B64D 27/24 | (2006.01) |
| H02M 3/04 | (2006.01) |
| H02J 7/00 | (2006.01) |

(52) U.S. Cl.
CPC .......... *H02J 7/00712* (2020.01); *B64D 27/24* (2013.01); *H02J 7/0048* (2020.01);
(Continued)

(58) Field of Classification Search
CPC .. H02J 7/00712; H02J 7/0048; H02J 2310/44; H02J 1/102; H02J 1/082;
(Continued)

(56) References Cited

U.S. PATENT DOCUMENTS

| 2011/0100735 A1* | 5/2011 | Flett ................ B60L 50/13 |
| | | 180/65.285 |
| 2013/0076129 A1* | 3/2013 | Kunimitsu .......... B60L 58/15 |
| | | 307/10.7 |

(Continued)

FOREIGN PATENT DOCUMENTS

DE     10 2014 006772 A1     11/2015

OTHER PUBLICATIONS

Extended European Search Report in the corresponding European Application No. 22151639.6, dated Jul. 6, 2022, 9 pages.

*Primary Examiner* — Lincoln D Donovan
*Assistant Examiner* — Alex W Lam
(74) *Attorney, Agent, or Firm* — Quinn IP Law (57) ABSTRACT

An apparatus is provided that includes a string of power sources and step-down circuitry. The power sources are connected in series to provide a first voltage rail at a first voltage, and the string of power sources is divided into power-source segments. The step-down circuitry electrically is configured to provide a second voltage rail at a second, lesser voltage. The step-down circuitry includes control circuitry configured to monitor states of charge of the power-source segments, and control selection of one of the power-source segments to deliver an output from which the second voltage rail is provided, based on the states of charge. One or more first electronic components are electrically coupled to the first voltage rail, and designed to operate at the first voltage. And one or more second electronic components are electrically coupled to the second voltage rail, and designed to operate at the second voltage.

22 Claims, 5 Drawing Sheets

(52) U.S. Cl.
CPC ........... *H02M 3/04* (2013.01); *B64D 2221/00* (2013.01); *H02J 2310/44* (2020.01)

(58) Field of Classification Search
CPC .... H02J 2310/48; H02J 7/0063; H02J 7/0016; B64D 27/24; B64D 2221/00; H02M 3/04; Y02T 10/70; Y02T 50/60
See application file for complete search history.

(56) References Cited

U.S. PATENT DOCUMENTS

| | | |
|---|---|---|
| 2016/0318411 A1 | 11/2016 | Goetz et al. |
| 2018/0050603 A1 | 2/2018 | Hand, III et al. |
| 2019/0283625 A1 | 9/2019 | Eriksson |

* cited by examiner

POWER TRANSFORMATION WITH POWER SOURCE BALANCING IN AN APPARATUS

CROSS-REFERENCE TO RELATED APPLICATION(S)

This application claims priority to U.S. Provisional Application No. 63/147,550, filed Feb. 9, 2021, entitled POWER TRANSFORMATION WITH POWER SOURCE BALANCING IN AN APPARATUS, the content of which is incorporated herein by reference in its entirety.

TECHNOLOGICAL FIELD

The present disclosure relates generally to electric power distribution and, in particular, to electric power distribution in electrically-powered systems such as those onboard vehicles.

BACKGROUND

Electric and hybrid vehicles such as aerial vehicles, road vehicles and the like are powered by sources of electric power such as batteries. These vehicles generally include one or more power sources, and a propulsion system one or more electric motors configured to power one or more propulsors to generate propulsive forces that cause the vehicle to move. Depending on the vehicle, these propulsors may include rotors, propellers, wheels and the like. The propulsion system may also include a drivetrain configured to deliver power from the electric motors to the propulsors; and for some vehicles, the electric motors and drivetrain may in some contexts be referred to as the powertrain of the vehicle.

Many of these vehicles are increasingly using a high-voltage power source for various benefits such as weight and efficiency optimization. In a number of current vehicles, this high-voltage power source can generally provide 600 to 800 V DC. A number of onboard components of these vehicles such as vehicle management system electronics, communications systems, navigation systems and the like are designed to operate at a lower voltage such as 24 to 28 V DC.

A number of techniques exist to provide lower-voltage power. Some techniques incorporate a second, lower-voltage power source packed with or separate from the high-voltage power source, but this adds additional packing weight and charging circuitry. Other techniques use a DC-to-DC converter to convert the high voltage to the lower-voltage, but these techniques may lack power-conversion efficiency and create excessive thermal dissipation due to a large input/output voltage difference. Yet other techniques simply use one or more (but less than all) cells in the high-voltage power source, but these techniques result in unbalanced cells and therefore cause unused capacity.

It would therefore be desirable to have an apparatus and method that takes into account at least some of the issues discussed above, as well as other possible issues.

BRIEF SUMMARY

As explained above, existing techniques to provide lower-voltage power in an apparatus with a high-voltage power source may add undesirable weight, power loss and thermal dissipation, or result in unbalanced cells and unused capacity. Example implementations of the present disclosure are directed to improved electric power distribution and, in particular, to electric power distribution in electrically-powered systems such as those onboard vehicles. Example implementations may transform a high-voltage power source into lower-voltage power, with source balancing to optimize utilization of power and energy.

Example implementations may provide lower-voltage power for onboard electronics from a high-voltage power source. Example implementations include a string of power sources divided into power-source segments at nodes between the power sources. The state of charge of these power-source segments may be monitored, and the power-source segments may be selected to balance their states of charge while converting the string of power sources at a high voltage to a lower voltage for various components onboard the apparatus.

The present disclosure thus includes, without limitation, the following example implementations.

Some example implementations provide an apparatus comprising: a string of power sources configured to provide electric power, the power sources connected in series to provide a first voltage rail at a first voltage, the string of power sources divided into power-source segments at nodes between the power sources; step-down circuitry electrically coupled to the string of power sources and configured to provide a second voltage rail at a second voltage that is less than the first voltage, the step-down circuitry including control circuitry configured to monitor states of charge of the power-source segments, and control selection of one of the power-source segments to deliver an output from which the second voltage rail is provided, based on the states of charge; one or more first electronic components electrically coupled to the first voltage rail, and designed to operate at the first voltage; and one or more second electronic components electrically coupled to the second voltage rail, and designed to operate at the second voltage.

In some example implementations of the apparatus of any preceding example implementation, or any combination of any preceding example implementations, the control circuitry configured to monitor the states of charge includes the control circuitry configured to monitor voltages provided by the power-source segments, and convert the voltages to the states of charge of the power-source segments.

In some example implementations of the apparatus of any preceding example implementation, or any combination of any preceding example implementations, the control circuitry configured to control selection of the one of the power-source segments includes the control circuitry configured to select the one of the power-source segments that has a highest of the states of charge.

In some example implementations of the apparatus of any preceding example implementation, or any combination of any preceding example implementations, the step-down circuitry further includes a DC-to-DC converter switchably connected to the one of the power-source segments that is selectable, and configured to input the electric power from the one of the power-source segments and deliver a voltage-regulated output as the output from which the second voltage rail is provided, and wherein the control circuitry is configured to control selection of the one of the power-source segments connected to the DC-to-DC converter based on the states of charge.

In some example implementations of the apparatus of any preceding example implementation, or any combination of any preceding example implementations, the step-down circuitry further includes a multi-throw switch coupled to and between the string of power sources and the DC-to-DC converter, the multi-throw switch configured to switchably connect the DC-to-DC converter to the one of the power-source segments, and wherein the control circuitry configured to control selection of the one of the power-source segments incudes the control circuitry configured to control the multi-throw switch.

In some example implementations of the apparatus of any preceding example implementation, or any combination of any preceding example implementations, the power-source segments are connected to the nodes at respective pairs of terminals of the power-source segments, and wherein the multi-throw switch is a double-pole, multi-throw switch including inputs connected to the respective pairs of terminals of two or more of the power-source segments, and outputs connected to the DC-to-DC converter.

In some example implementations of the apparatus of any preceding example implementation, or any combination of any preceding example implementations, the DC-to-DC converter is a first DC-to-DC converter switchably connected to one of a first group of the power-source segments, and the step-down circuitry further includes a second DC-to-DC converter switchably connected to one of a second group of the power-source segments, the first DC-to-DC converter and the second DC-to-DC converter are configured to deliver voltage-regulated outputs, the first DC-to-DC converter and the second DC-to-DC converter connected in parallel to provide the second voltage rail, and wherein the control circuitry configured to control selection of the one of the power-source segments includes the control circuitry configured to control selection of the one of the first group of the power-source segments, and the one of the second group of the power-source segments.

In some example implementations of the apparatus of any preceding example implementation, or any combination of any preceding example implementations, the step-down circuitry further includes a first multi-throw switch coupled to and between those power-source segments of the first group of the power-source segments and the first DC-to-DC converter, and a second multi-throw switch coupled to and between those power-source segments of the second group of the power-source segments and the second DC-to-DC converter, and wherein the control circuitry configured to control selection of the one of the first group of the power-source segments, and the one of the second group of the power-source segments, includes the control circuitry configured to control the first multi-throw switch and the second multi-throw switch.

In some example implementations of the apparatus of any preceding example implementation, or any combination of any preceding example implementations, the power-source segments are connected to the nodes at respective pairs of terminals of the power-source segments, wherein the first multi-throw switch is a first double-pole, multi-throw switch including first inputs connected to the respective pairs of terminals of those of the power-source segments of the first group of the power-source segments, and first outputs connected to the first DC-to-DC converter, and wherein the second multi-throw switch is a second double-pole, multi-throw switch including second inputs connected to the respective pairs of terminals of those of the power-source segments of the second group of the power-source segments, and second outputs connected to the second DC-to-DC converter.

In some example implementations of the apparatus of any preceding example implementation, or any combination of any preceding example implementations, the step-down circuitry further includes a plurality of DC-to-DC converters switchably connected to ones of the power-source segments that are selectable, and configured to input the electric power from the ones of the power-source segments and deliver voltage-regulated outputs, the DC-to-DC converters connected in parallel to provide the second voltage rail, and wherein the control circuitry is configured to control the ones of the power-source segments connected to the DC-to-DC converters based on the states of charge.

In some example implementations of the apparatus of any preceding example implementation, or any combination of any preceding example implementations, the apparatus is a vehicle including a basic structure and a propulsion system including a plurality of electric motors configured to power a plurality of propulsors to generate propulsive forces that cause the vehicle to move, the one or more first electronic components include the plurality of electric motors, and the one or more second electronic components include at least vehicle management system electronics.

Some example implementations provide a method of managing power in an apparatus, the method comprising: providing the apparatus including: a string of power sources to provide electric power, the power sources connected in series to provide a first voltage rail at a first voltage at which one or more first electronic components electrically coupled to the first voltage rail are designed to operate, the string of power sources divided into power-source segments at nodes between the power sources; and step-down circuitry electrically coupled to the string of power sources, and configured to provide a second voltage rail at a second voltage at which one or more second electronic components electrically coupled to the second voltage rail are designed to operate, the second voltage less than the first voltage; monitoring states of charge of the power-source segments; and controlling selection of one of the power-source segments to deliver an output from which the second voltage rail is provided, based on the states of charge.

In some example implementations of the method of any preceding example implementation, or any combination of any preceding example implementations, monitoring the states of charge includes monitoring voltages provided by the power-source segments, and converting the voltages to the states of charge of the power-source segments.

In some example implementations of the method of any preceding example implementation, or any combination of any preceding example implementations, controlling selection of the one of the power-source segments includes selecting the one of the power-source segments that has a highest of the states of charge.

In some example implementations of the method of any preceding example implementation, or any combination of any preceding example implementations, the step-down circuitry further includes a DC-to-DC converter, and the method further comprises: switchably connecting the DC-to-DC converter to the one of the power-source segments; and inputting the electric power from one of the power-source segments at the DC-to-DC converter, and delivering from the DC-to-DC converter, a voltage-regulated output as the output from which the second voltage rail is provided, and wherein controlling selection of the one of the power-source segments includes controlling selection of the one of the power-source segments connected to the DC-to-DC converter based on the states of charge.

In some example implementations of the method of any preceding example implementation, or any combination of any preceding example implementations, the step-down circuitry further includes a multi-throw switch coupled to and between the string of power sources and the DC-to-DC converter, and wherein controlling selection of the one of the power-source segments incudes controlling the multi-throw switch.

In some example implementations of the method of any preceding example implementation, or any combination of any preceding example implementations, the power-source segments are connected to the nodes at respective pairs of terminals of the power-source segments, and wherein the multi-throw switch is a double-pole, multi-throw switch including inputs connected to the respective pairs of terminals of two or more of the power-source segments, and outputs connected to the DC-to-DC converter, and controlling the multi-throw switch includes controlling the double-pole, multi-throw switch.

In some example implementations of the method of any preceding example implementation, or any combination of any preceding example implementations, the DC-to-DC converter is a first DC-to-DC converter switchably connected to one of a first group of the power-source segments, and the step-down circuitry further includes a second DC-to-DC converter connected in parallel with the first DC-to-DC converter provide the second voltage rail, and wherein the method further comprises switchably connecting the second DC-to-DC converter to one of a second group of the power-source segments, and wherein controlling selection of the one of the power-source segments includes controlling selection of the one of the first group of the power-source segments, and the one of the second group of the power-source segments.

In some example implementations of the method of any preceding example implementation, or any combination of any preceding example implementations, the step-down circuitry further includes a first multi-throw switch coupled to and between those power-source segments of the first group of the power-source segments and the first DC-to-DC converter, and a second multi-throw switch coupled to and between those power-source segments of the second group of the power-source segments and the second DC-to-DC converter, and wherein controlling selection of the one of the first group of the power-source segments, and the one of the second group of the power-source segments, includes controlling the first multi-throw switch and the second multi-throw switch.

In some example implementations of the method of any preceding example implementation, or any combination of any preceding example implementations, the power-source segments are connected to the nodes at respective pairs of terminals of the power-source segments, wherein the first multi-throw switch is a first double-pole, multi-throw switch including first inputs connected to the respective pairs of terminals of those of the power-source segments of the first group of the power-source segments, and first outputs connected to the first DC-to-DC converter, wherein the second multi-throw switch is a second double-pole, multi-throw switch including second inputs connected to the respective pairs of terminals of those of the power-source segments of the second group of the power-source segments, and second outputs connected to the second DC-to-DC converter, and wherein controlling selection of the one of the first group of the power-source segments, and the one of the second group of the power-source segments, includes controlling the first double-pole, multi-throw switch and the second double-pole, multi-throw switch.

In some example implementations of the method of any preceding example implementation, or any combination of any preceding example implementations, the step-down circuitry further includes a plurality of DC-to-DC converters connected in parallel to provide the second voltage rail, switchably connecting the DC-to-DC converter includes switchably connecting the plurality of DC-to-DC converters to ones of the power-source segments, and inputting the electric power includes inputting the electric power from the ones of the power-source segments, and delivering the voltage-regulated output includes delivering voltage-regulated outputs, and wherein controlling selection of the one of the power-source segments includes controlling the ones of the power-source segments connected to the DC-to-DC converters based on the states of charge.

In some example implementations of the method of any preceding example implementation, or any combination of any preceding example implementations, the apparatus is a vehicle including a basic structure and a propulsion system including a plurality of electric motors configured to power a plurality of propulsors to generate propulsive forces that cause the vehicle to move, the one or more first electronic components include the plurality of electric motors, and the one or more second electronic components include at least vehicle management system electronics, and wherein controlling selection of the one of the power-source segments includes controlling selection of the one of the power-source segments to deliver the output to power at least the vehicle management system electronics.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to electric power distribution and, in particular, to electric power distribution in electrically-powered systems such as those onboard vehicles. Example implementations of the present disclosure may be applicable to any of a number of different apparatuses. An apparatus according to example implementations of the present disclosure may be an electronic or electro-mechanical device. The apparatus includes components designed to operate at different voltages. Some components may be designed to operate at a first voltage that is higher than a second voltage at which some other components of the apparatus are designed to operate.

Some suitable examples of apparatuses include vehicles such as electric or hybrid vehicles. As used herein, a vehicle is a machine designed as an instrument of conveyance by land, water or air. A vehicle designed and configurable to fly may at times be referred to as an aerial vehicle or aircraft. A vehicle designed and configurable to operate with at least some level of autonomy may at times be referred to as an autonomous vehicle, or an autonomous aerial vehicle or aircraft in the case of an autonomous vehicle that is also designed and configurable to fly. Other examples of suitable vehicles include a variety of road vehicles, railed vehicles, watercraft (surface vessels, underwater vessels), amphibious vehicles, spacecraft and the like. In some examples, the vehicle is an electric vehicle such as an electric road or rail vehicle, an electric aircraft, an electric spacecraft or the like.

Figure 1:
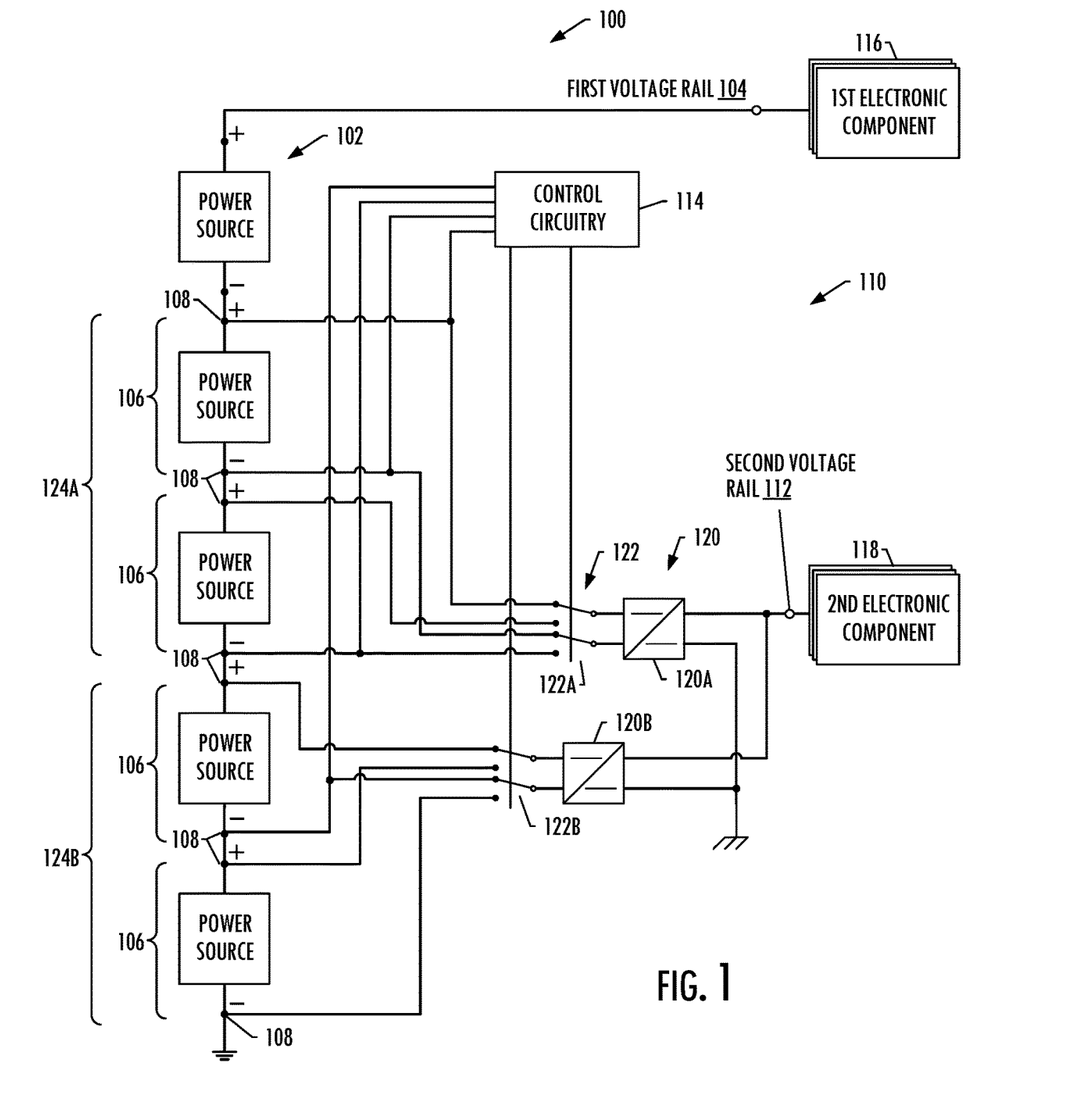
FIG. 1 illustrates an apparatus according to example implementations of the present disclosure.

FIG. 1 illustrates an apparatus 100 according to example implementations of the present disclosure. As shown, the apparatus includes a string of power sources 102 configured to provide electric power such as DC electric power. The power sources are connected in series to provide a first voltage rail 104 at a first voltage, and the string of power sources is divided into power-source segments 106 at nodes 108 between the power sources. In this regard, the first voltage may be the sum of voltages provided by the power sources of the string; and in some examples, the string may be divided so that the first voltage is evenly divided between the power-source segments.

Power sources of the string of power sources 102 are sources of electric power from which electronic components of the apparatus are powered to operate. Examples of suitable power sources include batteries, solar panels, fuel cells, electric generators and the like. In particular, for example, the string of power sources may include a battery string or bank with a number of cells/batteries connected in series to produce a battery or battery string with a desired usable voltage such as 600 V DC, 800 V DC or the like. In some examples, this desired usable voltage is the first voltage rail (or power supply rail).

The apparatus 100 includes step-down circuitry 110 electrically coupled to the string of power sources 102 and configured to provide a second voltage rail 112 at a second voltage (e.g., 24 V DC, 28 V DC) that is less than the first voltage of the first voltage rail 104. The step-down circuitry includes control circuitry 114 configured to monitor states of charge of the power-source segments. The state of charge (SoC) of a power source such as a battery is the level of charge of the power source relative to its capacity, which may be given in percentages from 0% (empty) to 100% (fully charged). In some examples, the control circuitry is configured to monitor voltages provided by the power-source segments 106, and convert the voltages to the states of charge of the power-source segments. The control circuitry is configured to control selection of one of the power-source segments to deliver an output from which the second voltage rail is provided, based on the states of charge.

In some examples, the control circuitry 114 is configured to select the one of the power-source segments 106 that has a highest of the states of charge. The control circuitry may continuously, periodically or otherwise repeatedly monitor the states of charge and select one of the power-source segments such as the one with the highest SoC. In this manner, the control circuitry may select among the power-source segments to balance their states of charge, while converting from the first voltage of the first voltage rail 104 to the second voltage of the second voltage rail 112. The control circuitry may also accommodate a fault or failure of one or more of the power sources of one or more power-source segments that results in a SoC consistently lower than others of the power-source segments.

The apparatus 100 further includes one or more first electronic components 116 electrically coupled to the first voltage rail 104, and designed to operate at the first voltage. Similarly, the apparatus includes one or more second electronic components 118 electrically coupled to the second voltage rail 112, and designed to operate at the second voltage. In some examples, the one or more first electronic components have a first voltage rating that indicates the first voltage at which the one or more first electronic components are designed to operate. Similarly, the one or more second electronic components have a second voltage rating that indicates the second voltage at which the one or more second electronic components are designed to operate. Electronic components of the apparatus including the first and second electronic components may be electrically coupled to respectively the first and second voltage rails in any of a number of different manners. In some examples, the apparatus includes appropriate power distribution circuitry with power transmission lines, power electronics and or circuitry to electrically couple the electronic components to the voltage rails.

As also shown in FIG. 1, in some examples, the step-down circuitry 110 further includes a DC-to-DC converter 120 switchably connected to the one of the power-source segments 106 that is selectable. The DC-to-DC converter is configured to input the electric power from the one of the power-source segments 106 and deliver a voltage-regulated output as the output from which the second voltage rail 112 is provided. In some of these examples, the control circuitry 114 is configured to control selection of the one of the power-source segments connected to the DC-to-DC converter 120 based on the states of charge.

In some further examples, the step-down circuitry 110 further includes a multi-throw switch 122 coupled to and between the string of power sources 102 and the DC-to-DC converter 120. In some of these examples, the multi-throw switch is configured to switchably connect the DC-to-DC converter to the one of the power-source segments 106, and the control circuitry 114 is configured to control the multi-throw switch to thereby to control selection of the one of the power-source segments. In some even further examples, the power-source segments 106 are connected to the nodes 108 at respective pairs of terminals (+, −) of the power-source segments. In some of these even further examples, the multi-throw switch 122 is a double-pole, multi-throw switch including inputs connected to the respective pairs of terminals of two or more of the power-source segments, and outputs connected to the DC-to-DC converter 120.

In some examples, the DC-to-DC converter 120 is a first DC-to-DC converter 120A switchably connected to one of a first group 124A of the power-source segments 106, and the step-down circuitry 110 further includes a second DC-to-DC converter 120B switchably connected to one of a second group 124B of the power-source segments. In these examples, the first DC-to-DC converter and the second DC-to-DC converter are configured to deliver voltage-regulated outputs, and the first DC-to-DC converter and the second DC-to-DC converter connected in parallel to provide the second voltage rail 112. The control circuitry 114 configured to control selection of the one of the power-source segments, then, includes the control circuitry configured to control selection of the one of the first group of the power-source segments, and the one of the second group of the power-source segments.

In some further examples, the step-down circuitry 110 further includes a first multi-throw switch 122A coupled to and between those power-source segments 106 of the first group 124A of the power-source segments and the first DC-to-DC converter 120A. Similarly, the step-down circuitry includes a second multi-throw switch 122B coupled to and between those power-source segments of the second group 124B of the power-source segments and the second DC-to-DC converter 120B. In some of these examples, the control circuitry 114 is configured to control the first multi-throw switch and the second multi-throw switch.

In some examples in which the power-source segments 106 are connected to the nodes 108 at respective pairs of terminals (+, −) of the power-source segments, the first multi-throw switch 122A is a first double-pole, multi-throw switch, and the second multi-throw switch 122B is a second double-pole, multi-throw switch. The first double-pole, multi-throw switch includes first inputs connected to the respective pairs of terminals of those of the power-source segments of the first group 124A of the power-source segments, and first outputs connected to the first DC-to-DC converter 120A. Similarly, the second double-pole, multi-throw switch includes second inputs connected to the respective pairs of terminals of those of the power-source segments of the second group 124B of the power-source segments, and second outputs connected to the second DC-to-DC converter 120B.

As described above, in various examples, the step-down circuitry 110 further includes a plurality of DC-to-DC converters 120 switchably connected to ones of the power-source segments 106 that are selectable. The plurality of DC-to-DC converters are configured to input the electric power from the ones of the power-source segments and deliver voltage-regulated outputs, the DC-to-DC converters connected in parallel to provide the second voltage rail 112, which may help optimize DC-to-DC conversion efficiency and capacity of the string of power sources 102. In some of these examples, the control circuitry 114 is configured to control the ones of the power-source segments connected to the DC-to-DC converters based on the states of charge.

As also indicated above, some suitable examples of an apparatus 100 include vehicles such as electric or hybrid vehicles. The vehicle may be manned or unmanned. The vehicle may be fully human-controlled, or the vehicle may be semi-autonomous or autonomous in which at least some of its maneuvers are executed independent of or with minimal human intervention. In some examples, the vehicle is operable in various modes with various amounts of human control.

A vehicle generally includes a basic structure and a propulsion system. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more electric motors configured to power one or more propulsors to generate propulsive forces that cause the vehicle to move. Although not separately shown, in some examples, one or more motor controllers may be included to coordinate performance of the one or more electric motors. A propulsor is any of a number of different means of converting power into a propulsive force. Examples of suitable propulsors include rotors, propellers, wheels and the like. In some examples, the propulsion system includes a drivetrain configured to deliver power from the electric motors to the propulsors. The electric motors and drivetrain may in some contexts be referred to as the powertrain of the vehicle.

Figure 2A:
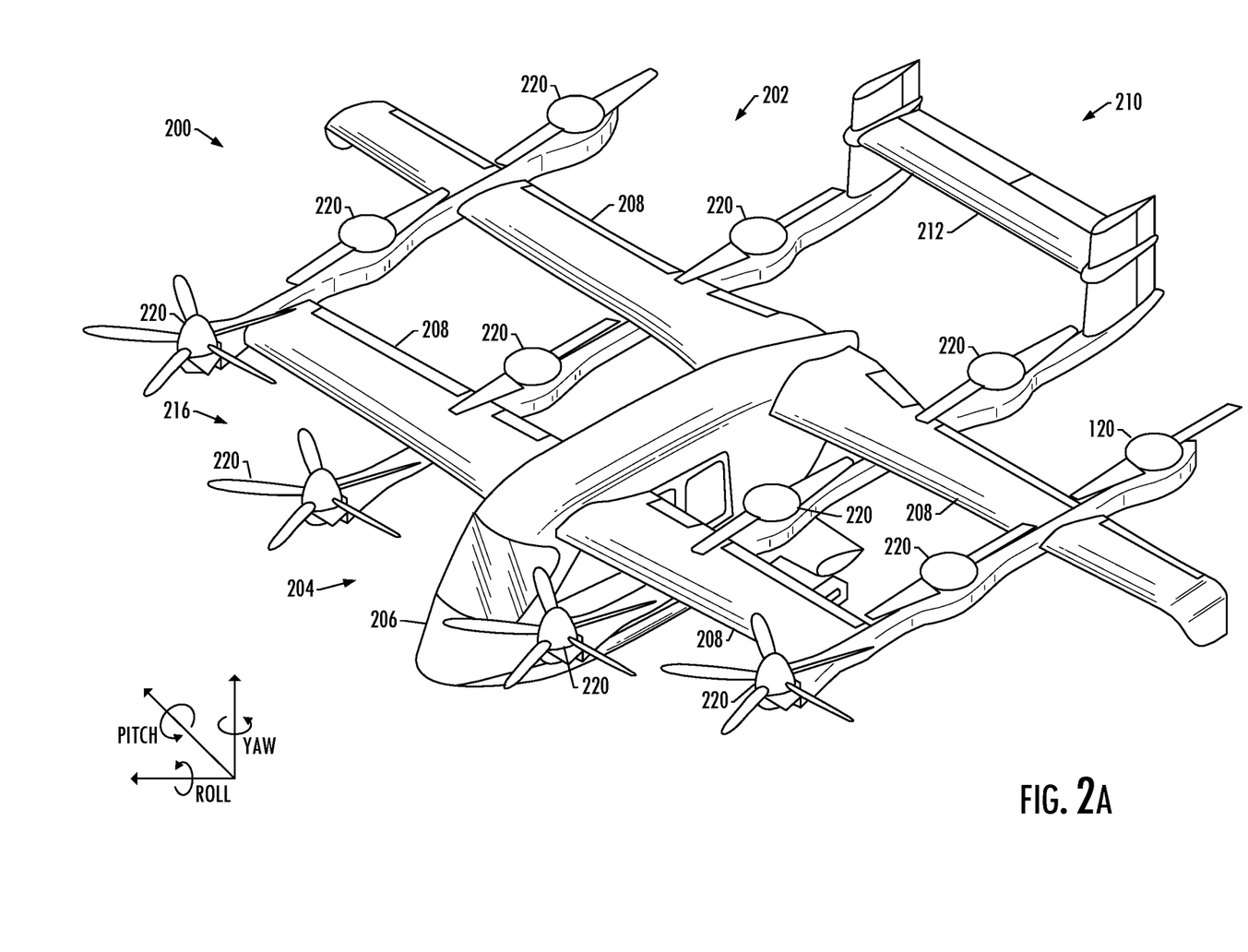
FIGS. 2A and 2B illustrate a more particular example of an apparatus, namely, a vehicle, according to example implementations.
Figure 2B:
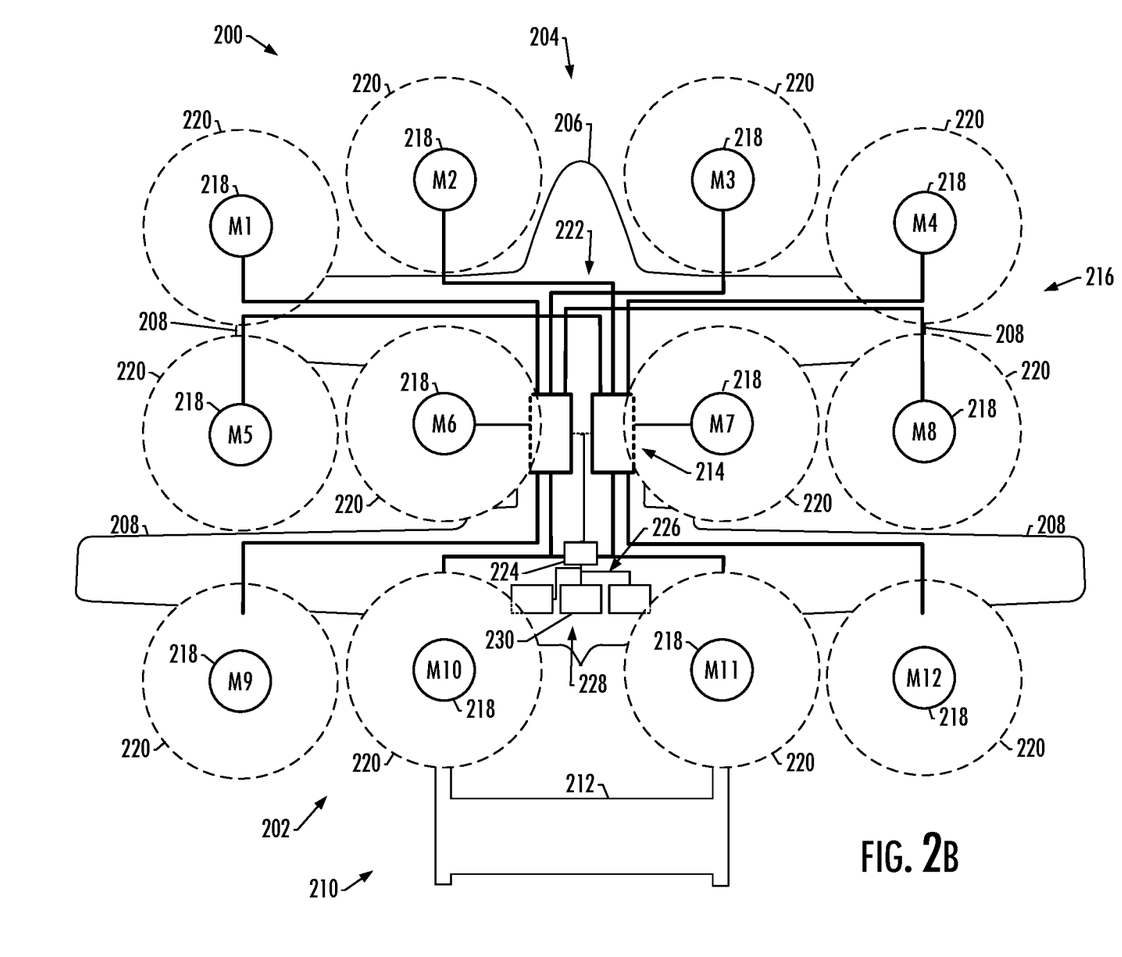

FIGS. 2A and 2B illustrate one type of vehicle 200, namely, an aircraft, that may benefit from example implementations of the present disclosure. As shown, the vehicle generally includes a basic structure 202 with an airframe 204 with including a fuselage 206, and one or more pairs of wings 208 that extend from opposing sides of the fuselage. The airframe also includes an empennage or tail assembly 210 at a rear end of the fuselage, and the tail assembly includes a stabilizer 212.

The vehicle 200 includes a string of power sources 214 that in some examples corresponds to the string of power sources 102. The vehicle includes a propulsion system 216 including a plurality of electric motors 218 configured to power a plurality of propulsors 220 to generate propulsive forces that cause the vehicle to move. The vehicle as shown includes twelve electric motors (labeled M1-M12), and the propulsors are rotors. Depending on the vehicle, in various examples, the propulsors include one or more of rotors, propellers or wheels. Also in the vehicle as shown, the plurality of electric motors are mounted to the one or more pairs of wings 208, and each wing has multiple ones of the electric motors mounted to the wing. The power sources are configured to provide a first voltage rail 222 at a first voltage, and first electronic components such as the electric motors are electrically coupled to the first voltage rail. The first voltage rail 222 and electric motors in some examples correspond to respectively the first voltage rail 104 and first electronic components 116.

The vehicle 200 includes step-down circuitry 224 that in some examples corresponds to step-down circuitry 110. The step-down circuitry is electrically coupled to the string of power sources 214 and configured to provide a second voltage rail 226 at a second voltage that is less than the first voltage. Second electronic components 228 that in some examples correspond to second electronic components 118 are electrically coupled to the second voltage rail, and designed to operate at the second voltage.

The second electronic components 228 of the vehicle 200 may include any of a number of systems, subsystems, components and the like. In particular, for example, the vehicle may include vehicle management system (VMS) electronics 230. The VMS is a vehicle-specific subsystem configured to manage subsystems and other components of the vehicle. These subsystems and other components including other second components include, for example, maneuver controls, landing gear, onboard environmental systems, electrical, pneumatic and hydraulic systems, communications systems, navigation systems and other subsystems and components for controlling operation and maneuvering of the vehicle.

FIGS. 3A-3G are flowcharts illustrating various steps in a method 300 of managing power in an apparatus 100 such as a vehicle 200, according to various example implementations. The method includes providing the apparatus, as shown at block 302. The apparatus includes a string of power sources 102 to provide electric power such as DC electric power. The power sources are connected in series to provide a first voltage rail 104 at a first voltage at which one or more first electronic components 116 electrically coupled to the first voltage rail are designed to operate, and the string of power sources is divided into power-source segments 106 at nodes 108 between the power sources. The apparatus also includes step-down circuitry 110 electrically coupled to the string of power sources, and configured to provide a second voltage rail 112 at a second voltage at which one or more second electronic components 118 electrically coupled to the second voltage rail are designed to operate, the second voltage less than the first voltage.

Figure 3A:
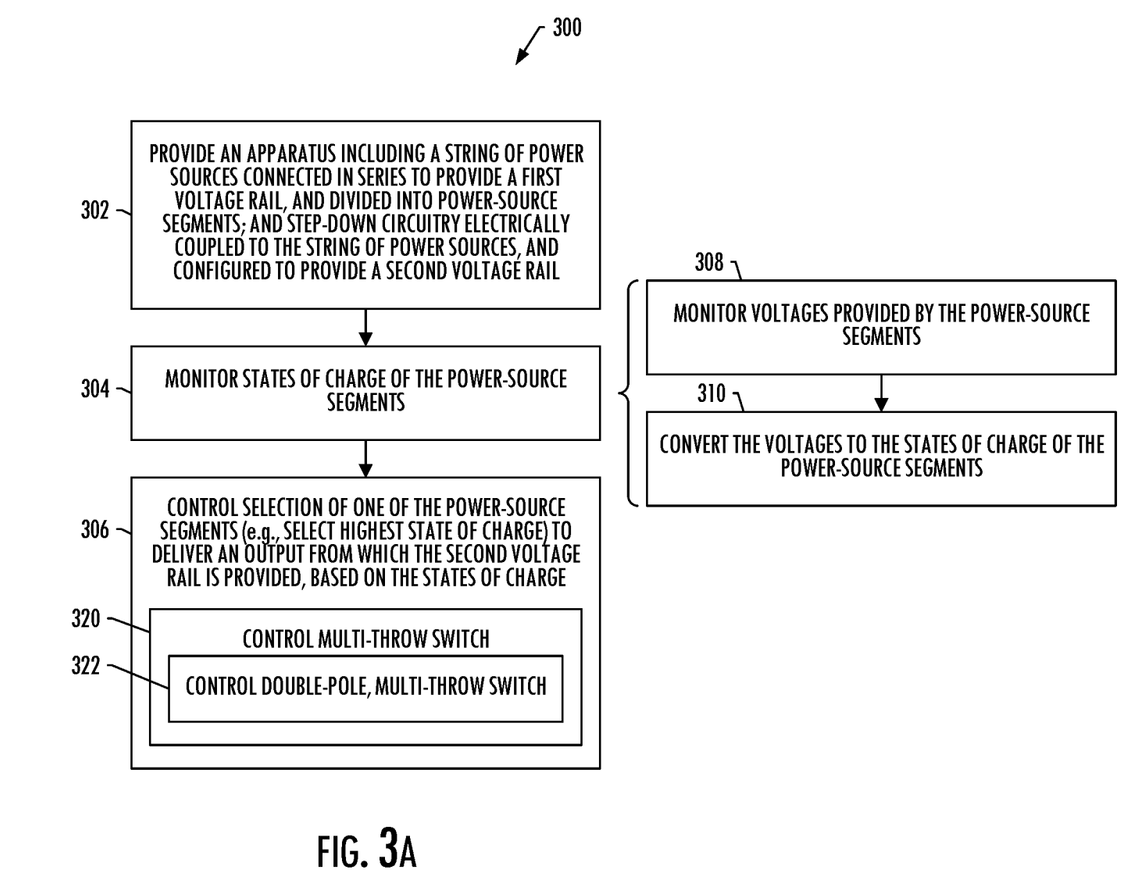
FIGS. 3A, 3B and 3C are flowcharts illustrating various steps in a method of managing power in an apparatus such as a vehicle, according to various example implementations.

The method 300 also includes monitoring states of charge of the power-source segments 106, as shown at block 304. And the method includes controlling selection of one of the power-source segments to deliver an output from which the second voltage rail 112 is provided, based on the states of charge, as shown at block 306.

In some examples, monitoring the states of charge at block 304 includes monitoring voltages provided by the power-source segments 106, and converting the voltages to the states of charge of the power-source segments, as shown at blocks 308 and 310.

In some examples, controlling selection of the one of the power-source segments 106 at block 306 includes selecting the one of the power-source segments that has a highest of the states of charge.

Figure 3B:
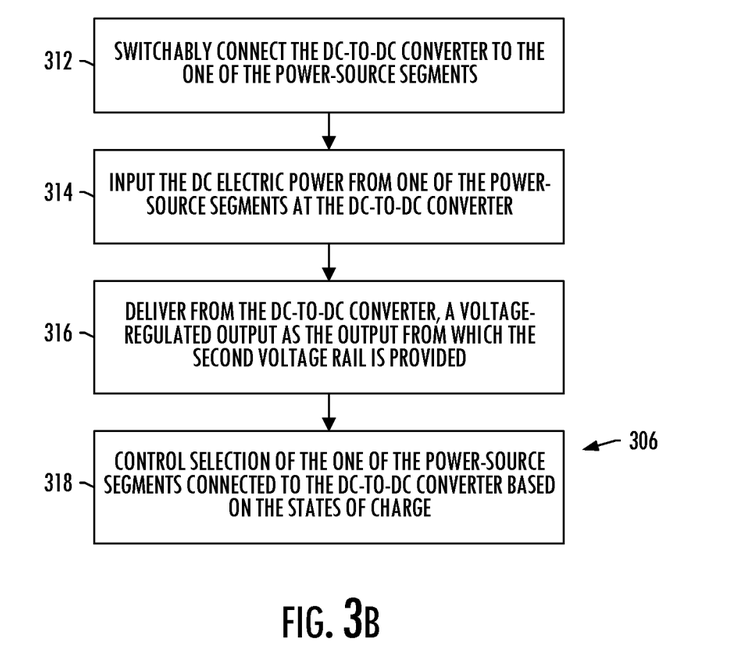

In some examples, the step-down circuitry 110 further includes a DC-to-DC converter 120, and the method further includes switchably connecting the DC-to-DC converter to the one of the power-source segments 106, as shown at block 312 of FIG. 3B. In some of these examples, the method also includes inputting the electric power from one of the power-source segments at the DC-to-DC converter, and delivering from the DC-to-DC converter, a voltage-regulated output as the output from which the second voltage rail 112 is provided, as shown at blocks 314 and 316. Controlling selection of the one of the power-source segments at block 306, then, includes controlling selection of the one of the power-source segments connected to the DC-to-DC converter based on the states of charge, as shown at block 318.

Briefly returning to FIG. 3A, in some examples, the step-down circuitry 110 further includes a multi-throw switch 122 coupled to and between the string of power sources 102 and the DC-to-DC converter 120, and controlling selection of the one of the power-source segments 106 at block 306 incudes controlling the multi-throw switch, as shown at block 320. In some further examples, the power-source segments are connected to the nodes 108 at respective pairs of terminals (+, −) of the power-source segments. In some of these further examples, the multi-throw switch is a double-pole, multi-throw switch including inputs connected to the respective pairs of terminals of two or more of the power-source segments, and outputs connected to the DC-to-DC converter, and controlling the multi-throw switch at block 320 includes controlling the double-pole, multi-throw switch, as shown at block 322.

Figure 3C:
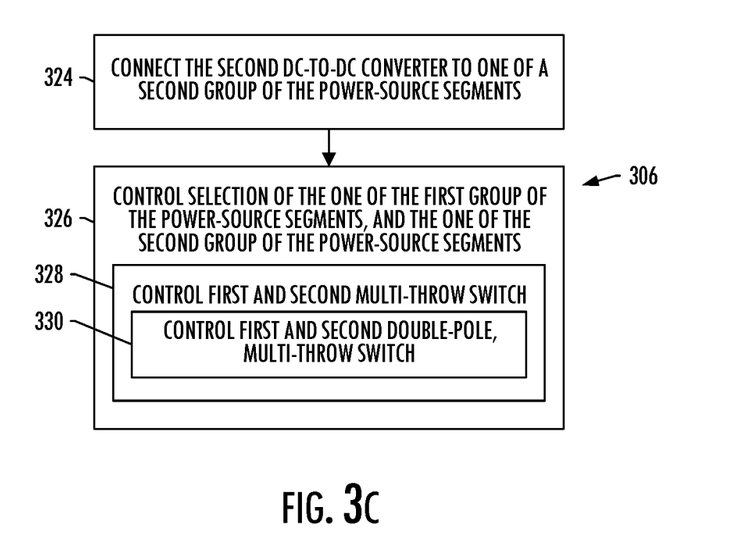

Turning to FIG. 3C, in some examples, the DC-to-DC converter 120 is a first DC-to-DC converter 120A switchably connected to one of a first group 124A of the power-source segments 106, and the step-down circuitry 110 further includes a second DC-to-DC converter 120B connected in parallel with the first DC-to-DC converter provide the second voltage rail 112. In some of these examples, the method 300 further includes switchably connecting 324 the second DC-to-DC converter to one of a second group 124B of the power-source segments, as shown at block 324. And controlling selection of the one of the power-source segments at block 306 includes controlling selection of the one of the first group of the power-source segments, and the one of the second group of the power-source segments, as shown at block 326.

In some examples, the step-down circuitry 110 further includes a first multi-throw switch 122A coupled to and between those power-source segments 106 of the first group 124A of the power-source segments and the first DC-to-DC converter 120A. Similarly, a second multi-throw switch 122B is coupled to and between those power-source segments of the second group 124B of the power-source segments and the second DC-to-DC converter 120B. In some of these examples, controlling selection of the one of the first group of the power-source segments, and the one of the second group of the power-source segments, at block 326 includes controlling the first multi-throw switch and the second multi-throw switch, as shown at block 328.

In some examples, the power-source segments 106 are connected to the nodes 108 at respective pairs of terminals (+, −) of the power-source segments. The first multi-throw switch 122A is a first double-pole, multi-throw switch, and the second multi-throw switch 122B is a second double-pole, multi-throw switch. The first double-pole, multi-throw switch includes first inputs connected to the respective pairs of terminals of those of the power-source segments of the first group 124A of the power-source segments, and first outputs connected to the first DC-to-DC converter 120A. The second double-pole, multi-throw switch includes second inputs connected to the respective pairs of terminals of those of the power-source segments of the second group 124B of the power-source segments, and second outputs connected to the second DC-to-DC converter 120B. In some of these examples, controlling selection of the one of the first group of the power-source segments, and the one of the second group of the power-source segments, at block 326 includes controlling the first double-pole, multi-throw switch and the second double-pole, multi-throw switch, as shown at block 330.

Returning to FIG. 3B, in some examples, the step-down circuitry 110 further includes a plurality of DC-to-DC converters 120 connected in parallel to provide the second voltage rail 112, and switchably connecting the DC-to-DC converter at block 312 includes switchably connecting the plurality of DC-to-DC converters to ones of the power-source segments 106. In some of these examples, inputting the electric power at block 314 includes inputting the electric power from the ones of the power-source segments, and delivering the voltage-regulated output at block 316 includes delivering voltage-regulated outputs. Also in some of these examples, controlling selection of the one of the power-source segments at block 318 includes controlling the ones of the power-source segments connected to the DC-to-DC converters based on the states of charge.

Now returning to FIG. 3A, in some examples, the apparatus 100 is a vehicle 200 including a basic structure 202 and a propulsion system 216 including a plurality of electric motors 218 configured to power a plurality of propulsors 220 to generate propulsive forces that cause the vehicle to move. The one or more first electronic components 116 include the plurality of electric motors, and the one or more second electronic components 118 include at least vehicle management system electronics 230. And controlling selection of the one of the power-source segments 106 at block 306 includes controlling selection of the one of the power-source segments to deliver the output to power at least the vehicle management system electronics.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
  a string of power sources configured to provide electric power and are connected in series to provide a first voltage rail at a first voltage, wherein the string of power sources are divided into power-source segments at nodes between the power sources;
  step-down circuitry electrically coupled to the string of power sources and configured to provide a second voltage rail at a second voltage that is less than the first voltage, the step-down circuitry including control circuitry configured to monitor states of charge of the power-source segments, and control selection of one of the power-source segments to deliver an output from which the second voltage rail is provided, based on the states of charge;
  one or more first electronic components electrically coupled to the first voltage rail, and designed to operate at the first voltage;
  one or more second electronic components electrically coupled to the second voltage rail, and designed to operate at the second voltage; and
  wherein the one or more first electronic components include a plurality of electric motors, and the one or more second electronic components include at least vehicle management system electronics.

2. The apparatus of claim 1, wherein the control circuitry configured to monitor the states of charge includes the control circuitry configured to monitor voltages provided by the power-source segments, and convert the voltages to the states of charge of the power-source segments.

3. The apparatus of claim 1, wherein the control circuitry configured to control selection of the one of the power-source segments includes the control circuitry configured to select the one of the power-source segments that has a highest of the states of charge.

4. The apparatus of claim 1, wherein the step-down circuitry further includes a DC-to-DC converter switchably connected to the one of the power-source segments that is selectable, and configured to input the electric power from the one of the power-source segments and deliver a voltage-regulated output as the output from which the second voltage rail is provided; and
  wherein the control circuitry is configured to control selection of the one of the power-source segments connected to the DC-to-DC converter based on the states of charge.

5. An apparatus comprising:
  a string of power sources configured to provide electric power and are connected in series to provide a first voltage rail at a first voltage, wherein the string of power sources are divided into power-source segments at nodes between the power sources;
  step-down circuitry electrically coupled to the string of power sources and configured to provide a second voltage rail at a second voltage that is less than the first voltage, the step-down circuitry including control circuitry configured to monitor states of charge of the power-source segments, and control selection of one of the power-source segments to deliver an output from which the second voltage rail is provided, based on the states of charge;
  one or more first electronic components electrically coupled to the first voltage rail, and designed to operate at the first voltage;
  one or more second electronic components electrically coupled to the second voltage rail, and designed to operate at the second voltage;
  wherein the step-down circuitry further includes a DC-to-DC converter switchably connected to the one of the power-source segments that is selectable, and configured to input the electric power from the one of the power-source segments and deliver a voltage-regulated output as the output from which the second voltage rail is provided, wherein the control circuitry is configured to control selection of the one of the power-source segments connected to the DC-to-DC converter based on the states of charge;

wherein the step-down circuitry further includes a multi-throw switch coupled to and between the string of power sources and the DC-to-DC converter, wherein the multi-throw switch configured to switchably connect the DC-to-DC converter to the one of the power-source segments; and wherein the control circuitry configured to control selection of the one of the power-source segments incudes the control circuitry configured to control the multi-throw switch.

6. The apparatus of claim 5, wherein the power-source segments are connected to the nodes at respective pairs of terminals of the power-source segments; and wherein the multi-throw switch is a double-pole, and the multi-throw switch includes inputs connected to the respective pairs of terminals of two or more of the power-source segments, and outputs connected to the DC-to-DC converter.

7. An apparatus comprising:

a string of power sources configured to provide electric power and are connected in series to provide a first voltage rail at a first voltage, wherein the string of power sources are divided into power-source segments at nodes between the power sources;

step-down circuitry electrically coupled to the string of power sources and configured to provide a second voltage rail at a second voltage that is less than the first voltage, the step-down circuitry including control circuitry configured to monitor states of charge of the power-source segments, and control selection of one of the power-source segments to deliver an output from which the second voltage rail is provided, based on the states of charge;

one or more first electronic components electrically coupled to the first voltage rail, and designed to operate at the first voltage;

one or more second electronic components electrically coupled to the second voltage rail, and designed to operate at the second voltage;

wherein the step-down circuitry further includes a DC-to-DC converter switchably connected to the one of the power-source segments that is selectable, and configured to input the electric power from the one of the power-source segments and deliver a voltage-regulated output as the output from which the second voltage rail is provided, wherein the control circuitry is configured to control selection of the one of the power-source segments connected to the DC-to-DC converter based on the states of charge;

wherein the DC-to-DC converter is a first DC-to-DC converter switchably connected to one of a first group of the power-source segments, and the step-down circuitry further includes a second DC-to-DC converter switchably connected to one of a second group of the power-source segments, the first DC-to-DC converter and the second DC-to-DC converter are configured to deliver voltage-regulated outputs, the first DC-to-DC converter and the second DC-to-DC converter connected in parallel to provide the second voltage rail; and wherein the control circuitry configured to control selection of the one of the power-source segments includes the control circuitry configured to control selection of the one of the first group of the power-source segments, and the one of the second group of the power-source segments.

8. The apparatus of claim 7, wherein the step-down circuitry further includes a first multi-throw switch coupled to and between the power-source segments of the first group of the power-source segments and the first DC-to-DC converter, and a second multi-throw switch coupled to and between the power-source segments of the second group of the power-source segments and the second DC-to-DC converter; and wherein the control circuitry configured to control selection of the one of the first group of the power-source segments, and the one of the second group of the power-source segments, includes the control circuitry configured to control the first multi-throw switch and the second multi-throw switch.

9. The apparatus of claim 8, wherein the power-source segments are connected to the nodes at respective pairs of terminals of the power-source segments;

wherein the first multi-throw switch is a first double-pole multi-throw switch, and the first multi-throw switch includes first inputs connected to the respective pairs of terminals of the power-source segments of the first group of the power-source segments, and first outputs connected to the first DC-to-DC converter; and wherein the second multi-throw switch is a second double-pole multi-throw switch, and the second multi-throw switch includes second inputs connected to the respective pairs of terminals of the power-source segments of the second group of the power-source segments, and second outputs connected to the second DC-to-DC converter.

10. The apparatus of claim 1, wherein the step-down circuitry further includes a plurality of DC-to-DC converters switchably connected to ones of the power-source segments that are selectable, and configured to input the electric power from the ones of the power-source segments and deliver voltage-regulated outputs, the DC-to-DC converters connected in parallel to provide the second voltage rail; and wherein the control circuitry is configured to control the ones of the power-source segments connected to the DC-to-DC converters based on the states of charge.

11. The apparatus of claim 1, further including a vehicle having a basic structure and a propulsion system including the plurality of electric motors configured to power a plurality of propulsors to generate propulsive forces that cause the vehicle to move.

12. A method of managing power in an apparatus, the method comprising:

providing the apparatus including:

a string of power sources to provide electric power and are connected in series to provide a first voltage rail at a first voltage at which one or more first electronic components electrically coupled to the first voltage rail are designed to operate, wherein the string of power sources are divided into power-source segments at nodes between the power sources; and step-down circuitry electrically coupled to the string of power sources, and configured to provide a second voltage rail at a second voltage at which one or more second electronic components electrically coupled to the second voltage rail are designed to operate, the second voltage less than the first voltage;

monitoring states of charge of the power-source segments;

controlling selection of one of the power-source segments to deliver an output from which the second voltage rail is provided, based on the states of charge;

wherein the one or more first electronic components include a plurality of electric motors, and the one or more second electronic components include at least vehicle management system electronics; and wherein controlling selection of the one of the power-source segments includes controlling selection of the one of the power-source segments to deliver the output to power at least the vehicle management system electronics.

13. The method of claim 12, wherein monitoring the states of charge includes monitoring voltages provided by the power-source segments, and converting the voltages to the states of charge of the power-source segments.

14. The method of claim 12, wherein controlling selection of the one of the power-source segments includes selecting the one of the power-source segments that has a highest of the states of charge.

15. The method of claim 12, wherein the step-down circuitry further includes a DC-to-DC converter, and the method further comprises:

switchably connecting the DC-to-DC converter to the one of the power-source segments;

inputting the electric power from one of the power-source segments at the DC-to-DC converter, and delivering from the DC-to-DC converter, a voltage-regulated output as the output from which the second voltage rail is provided; and wherein controlling selection of the one of the power-source segments includes controlling selection of the one of the power-source segments connected to the DC-to-DC converter based on the states of charge.

16. A method of managing power in an apparatus, the method comprising:

providing the apparatus including:
a string of power sources to provide electric power and are connected in series to provide a first voltage rail at a first voltage at which one or more first electronic components electrically coupled to the first voltage rail are designed to operate, wherein the string of power sources are divided into power-source segments at nodes between the power sources; and
step-down circuitry electrically coupled to the string of power sources, and configured to provide a second voltage rail at a second voltage at which one or more second electronic components electrically coupled to the second voltage rail are designed to operate, the second voltage less than the first voltage;

monitoring states of charge of the power-source segments;

controlling selection of one of the power-source segments to deliver an output from which the second voltage rail is provided, based on the states of charge; and wherein the step-down circuitry further includes a DC-to-DC converter, and the method further comprises:

switchably connecting the DC-to-DC converter to the one of the power-source segments;

inputting the electric power from one of the power-source segments at the DC-to-DC converter, and delivering from the DC-to-DC converter, a voltage-regulated output as the output from which the second voltage rail is provided, and wherein controlling selection of the one of the power-source segments includes controlling selection of the one of the power-source segments connected to the DC-to-DC converter based on the states of charge;

wherein the step-down circuitry further includes a multi-throw switch coupled to and between the string of power sources and the DC-to-DC converter; and wherein controlling selection of the one of the power-source segments incudes controlling the multi-throw switch.

17. The method of claim 16, wherein the power-source segments are connected to the nodes at respective pairs of terminals of the power-source segments; and wherein the multi-throw switch is a double-pole multi-throw switch, and the multi-throw switch includes inputs connected to the respective pairs of terminals of two or more of the power-source segments, and outputs connected to the DC-to-DC converter, and controlling the multi-throw switch includes controlling the double-pole multi-throw switch.

18. The method of claim 15, wherein the DC-to-DC converter is a first DC-to-DC converter switchably connected to one of a first group of the power-source segments, and the step-down circuitry further includes a second DC-to-DC converter connected in parallel with the first DC-to-DC converter provide the second voltage rail;

wherein the method further comprises switchably connecting the second DC-to-DC converter to one of a second group of the power-source segments; and wherein controlling selection of the one of the power-source segments includes controlling selection of the one of the first group of the power-source segments, and the one of the second group of the power-source segments.

19. A method of managing power in an apparatus, the method comprising:

providing the apparatus including:
a string of power sources to provide electric power and are connected in series to provide a first voltage rail at a first voltage at which one or more first electronic components electrically coupled to the first voltage rail are designed to operate, wherein the string of power sources are divided into power-source segments at nodes between the power sources; and
step-down circuitry electrically coupled to the string of power sources, and configured to provide a second voltage rail at a second voltage at which one or more second electronic components electrically coupled to the second voltage rail are designed to operate, the second voltage less than the first voltage;

monitoring states of charge of the power-source segments;

controlling selection of one of the power-source segments to deliver an output from which the second voltage rail is provided, based on the states of charge; and wherein the step-down circuitry further includes a DC-to-DC converter, and the method further comprises:

switchably connecting the DC-to-DC converter to the one of the power-source segments;

inputting the electric power from one of the power-source segments at the DC-to-DC converter, and delivering from the DC-to-DC converter, a voltage-regulated output as the output from which the second voltage rail is provided, and wherein controlling selection of the one of the power-source segments includes controlling selection of the one of the power-source segments connected to the DC-to-DC converter based on the states of charge;

wherein the DC-to-DC converter is a first DC-to-DC converter switchably connected to one of a first group of the power-source segments, and the step-down circuitry further includes a second DC-to-DC converter connected in parallel with the first DC-to-DC converter provide the second voltage rail, wherein the method further comprises switchably connecting the second DC-to-DC converter to one of a second group of the power-source segments, and wherein controlling selection of the one of the power-source segments includes controlling selection of the one of the first group of the power-source segments, and the one of the second group of the power-source segments;

wherein the step-down circuitry further includes a first multi-throw switch coupled to and between the power-source segments of the first group of the power-source segments and the first DC-to-DC converter, and a second multi-throw switch coupled to and between the power-source segments of the second group of the power-source segments and the second DC-to-DC converter; and wherein controlling selection of the one of the first group of the power-source segments, and the one of the second group of the power-source segments, includes controlling the first multi-throw switch and the second multi-throw switch.

20. The method of claim 19, wherein the power-source segments are connected to the nodes at respective pairs of terminals of the power-source segments;

wherein the first multi-throw switch is a first double-pole multi-throw switch, and the first multi-throw switch includes first inputs connected to the respective pairs of terminals of the power-source segments of the first group of the power-source segments, and first outputs connected to the first DC-to-DC converter;

wherein the second multi-throw switch is a second double-pole multi-throw switch, and the second multi-throw switch includes second inputs connected to the respective pairs of terminals of those of the power-source segments of the second group of the power-source segments, and second outputs connected to the second DC-to-DC converter; and wherein controlling selection of the one of the first group of the power-source segments, and the one of the second group of the power-source segments, includes controlling the first double-pole multi-throw switch and the second double-pole multi-throw switch.

21. The method of claim 15, wherein the step-down circuitry further includes a plurality of DC-to-DC converters connected in parallel to provide the second voltage rail, switchably connecting the DC-to-DC converter includes switchably connecting the plurality of DC-to-DC converters to ones of the power-source segments, and inputting the electric power includes inputting the electric power from the ones of the power-source segments, and delivering the voltage-regulated output includes delivering voltage-regulated outputs; and wherein controlling selection of the one of the power-source segments includes controlling the ones of the power-source segments connected to the DC-to-DC converters based on the states of charge.

22. The method of claim 12, wherein the apparatus is a vehicle including a basic structure and a propulsion system including the plurality of electric motors configured to power a plurality of propulsors to generate propulsive forces that cause the vehicle to move.

* * * * *

UNITED STATES PATENT AND TRADEMARK OFFICE
CERTIFICATE OF CORRECTION

| | | |
|---|---|---|
| PATENT NO. | : 11,784,506 B2 | |
| APPLICATION NO. | : 17/457375 | |
| DATED | : October 10, 2023 | |
| INVENTOR(S) | : Wenjiang Yu et al. | |

It is certified that error appears in the above-identified patent and that said Letters Patent is hereby corrected as shown below:

In the Claims

Claim 20, Column 20, Line 6: "terminals of those of the" should read --terminals of the--

Signed and Sealed this
Twentieth Day of August, 2024

Katherine Kelly Vidal
*Director of the United States Patent and Trademark Office*